United States Patent [19]

Cahlander et al.

[11] Patent Number: 5,104,002
[45] Date of Patent: Apr. 14, 1992

[54] FOOD DISPENSER AND METHOD

[75] Inventors: Robert L. Cahlander, Red Wing; David W. Carroll, Cannon Falls; Gregory A. Lawrence, Red Wing; Brian R. Rudesill, Woodbury, all of Minn.

[73] Assignee: Restaurant Technology, Inc., Oak Brook, Ill.

[21] Appl. No.: 518,909

[22] Filed: May 4, 1990

[51] Int. Cl.$^5$ .............................................. G01F 11/00
[52] U.S. Cl. ......................................... 222/1; 222/56; 222/83; 222/143; 222/196; 99/407; 414/412
[58] Field of Search .............. 222/1, 56, 77, 83, 83.5, 222/143, 196, 233; 221/10, 11, 30-31, 97, 105, 106, 150 R, 150 HC, 150 A; 414/412, 404, 425; 99/407; 83/614

[56] References Cited

U.S. PATENT DOCUMENTS

| 2,466,386 | 4/1949 | Curioni | 198/524 |
|---|---|---|---|
| 2,807,203 | 9/1957 | Buechele et al. | 99/404 |
| 2,957,605 | 10/1960 | Gabrielsen | 221/105 |
| 3,183,856 | 5/1965 | Jolly | 99/450.4 |
| 3,279,653 | 10/1966 | Avery et al. | 414/420 |
| 3,442,200 | 5/1969 | Babel | 99/357 |
| 3,448,677 | 6/1969 | Dexters | 99/336 |
| 3,653,541 | 4/1972 | Crum | 221/150 HC |
| 3,747,785 | 7/1973 | Dahlin | 414/303 |
| 3,750,810 | 8/1973 | Stanfill | 414/421 |
| 3,954,052 | 5/1976 | Vegh et al. | 99/407 |
| 4,057,172 | 12/1977 | Olander | 221/10 |
| 4,163,489 | 8/1979 | Wahl | 222/56 |
| 4,270,669 | 6/1981 | Luke | 221/13 |
| 4,312,462 | 1/1982 | Faulkner et al. | 222/77 |
| 4,719,850 | 1/1988 | Sowell | 99/404 |
| 4,789,291 | 12/1988 | Allan | 414/797.8 |
| 4,921,388 | 5/1990 | Nelson | 414/412 |

FOREIGN PATENT DOCUMENTS

8020908 10/1980 France .
8912417 12/1989 World Int. Prop. O. ............ 99/407

Primary Examiner—Michael S. Huppert
Assistant Examiner—Philippe Derahshani
Attorney, Agent, or Firm—Jenner & Block

[57] ABSTRACT

A portioning dispenser for dispensing food items from bulk item containers is disclosed in which the dispenser can open and empty a bulk container and dispense a portion of its contents. In one embodiment, a container can be slit open and tipped on a pivotable platform to spill its contents to a feeder for further distribution while retaining a stack of unopened boxes thereabove. In some embodiments, the dispenser can discard an emptied container and replace it with an unopened container moved from a container hopper. In other embodiments, a vibrating feeder is used to shake emptied items into a transfer tray for weighing and dispensing. Additionally, a method for dispensing portions of bulk food items from bulk containers is disclosed which employs several of the steps mentioned above.

73 Claims, 7 Drawing Sheets

FOOD DISPENSER AND METHOD

FIELD OF THE INVENTION

The invention relates to an apparatus and method for the automatic portioning and dispensing of bulk food items, especially for quick service restaurants. More particularly, the invention relates to an apparatus and method for automatically dispensing portions of food items from a plurality of stored bulk food item containers.

BACKGROUND OF THE INVENTION

In restaurants, especially quick service (fast food) restaurants, fast, consistent, efficient and safe food preparation is essential for a successful operation. One important task frequently required in the preparation of fast food is the portioning of bulk food items supplied in bulk food containers.

Bulk food items are typically supplied in containers weighing several pounds or more. Each container holds a large number of individual food items such as french fries or chicken nuggets. The use of bulk containers is efficient because it minimizes the number of individual containers which must be transported to, handled, and stored at a restaurant. Because it is typically unnecessary, undesirable or impossible to prepare the entire contents of a given container at one time, the bulk food items must be portioned before cooking, heating or serving.

Portioning a bulk food product involves many of the efficiency, speed, safety and consistency considerations involved in fast food preparation generally. For example, consistent food preparation requires that portions be of a uniform size because over- or under-sized portions may yield an under- or over-prepared food product when the portion is cooked, heated or otherwise processed. Additionally, portioning should be performed quickly to minimize food preparation delays which may dissatisfy customers. Furthermore, portioning operations should be non-labor intensive so as to efficiently utilize restaurant labor, particularly when such workers are in high demand and difficult to procure. Finally, portioning operations should minimize the manual manipulation of food products by restaurant workers, thereby minimizing safety concerns related to food handling generally.

Although quick service restaurants have existed for many years and now number in the tens of thousands, these establishments typically continue to utilize labor intensive, manual processes to portion the contents of containerized bulk food products.

Accordingly, a need exists for a commercially suitable portioning apparatus for containerized bulk food items that minimizes manual food handling, requires little operator attention, and quickly, automatically and accurately portions bulk food items for serving or further preparation.

SUMMARY OF THE INVENTION

In accordance with the present invention, a portioning dispenser for containerized bulk items is disclosed that is especially adopted for a fast food restaurant. The dispenser is capable of receiving and storing a plurality of stacked bulk food item containers which it can consecutively empty and dispose of and dispensing accurately measured food product portions of desired quantity. The bulk food product can be virtually any food product packaged in bulk which requires proper portioning for preparation or serving. The food product could be, for example, any meat, fish or poultry "nugget" product, or a vegetable product such as french fries. The food product could be cooked or uncooked, and can be in either a frozen or a non-frozen condition. The present invention is especially suited for use with cardboard or paperboard containers.

More specifically, in one embodiment of the invention, structure is included for receiving at least one container of bulk items, opening the container, removing the container contents, receiving the removed contents, and dispensing the removed contents. Additional features can include structure for automatically discarding an empty container and replacing the emptied container with another unopened container.

In another embodiment of the invention, a dispenser opens a stored container and dumps its contents into a feeder which selectively dispenses the dumped contents. The dispenser can include a portioning device for measuring a predetermined portion of items so that a desired quantity can be dispensed from the dispenser, as well as a vertical hopper for storing and consecutively emptying a plurality of stacked containers.

Still another embodiment of the dispenser invention employs a pivotable platform located beneath a container hopper for consecutively dumping the contents of stored boxes into a feeder. The feeder selectively discharges items into a transfer tray, whose contents are measured by a scale. When the scale indicates that a predetermined weight of items is in the transfer tray, the transfer tray is emptied into a basket or other container for further processing.

The dispenser includes a box slitter for cutting open the rear panel of a box located on the pivotable platform. This allows the contents of the box to be discharged by gravity into a chute by lowering one side of the platform.

An additional feature that can be included in accordance with the invention is a moveable stack frame which can secure the second lowermost box in the container hopper by inserting four box support pins into the box. Still another feature that may be included is a moveable chute dump door which allows empty boxes to be discharged from the dispenser when the door is moved into a lowered position, and allows the box contents to be dumped into the chute when the door is in an upper position.

Yet another embodiment of the invention is a method for dispensing bulk items from containers by opening a container, tipping it to empty its contents into a feeder, selectively discharging items from the feeder into a transfer tray, measuring the quantity of the items in the tray, such as by weighing, and dispensing the items from the tray when a desired amount of items has been measured. In accordance with one embodiment, the food items can be discharged into the transfer tray by conveying the items by vibration. A further step can include discarding and replacing an empty container with a full container previously stored in the dispenser.

In accordance with one aspect of the invention, a food dispenser is provided which can portion containerized bulk food products for further processing.

In accordance with another aspect of the invention, a food dispenser is provided which automatically opens and portions containerized bulk food products, thereby providing for the sanitary handling of the bulk food products.

In accordance with still another aspect of the invention, a food dispenser is provided for portioning containerized bulk food products which can automatically determine when a new bulk food product container should be opened and emptied into the dispenser.

In accordance with yet another embodiment of the invention, an automated portioning dispenser for bulk food products is provided which reduces the need for manual operator intervention, thereby reducing labor costs and requirements.

DETAILED DESCRIPTION OF THE INVENTION

The following discussion and description of the drawings explains one embodiment of a food dispenser invention which can be used to quickly, accurately and safely portion food items which have been supplied to the dispenser in bulk containers. In FIGS. 1-10, in which like reference numerals refer to like parts, the illustrated embodiment of the invention stores a plurality of unopened bulk french fry boxes, opens and moves the boxes as required to maintain a supply of french fries in a vibrator-y feeder, feeds a portion of the feeder contents to a transfer tray, and dispenses the transfer tray contents to a fry basket. While the illustrated containers are cardboard boxes and the box contents are french fries, the containers may be of other styles and constructed from other materials. Additionally, the box contents may be any fresh or frozen, cooked or uncooked, meat, fish or poultry item such as patties or nuggets, or a vegetable food item other than french fries, any of which might require portioning or dispensing before cooking, heating or other processing.

Figure 1:
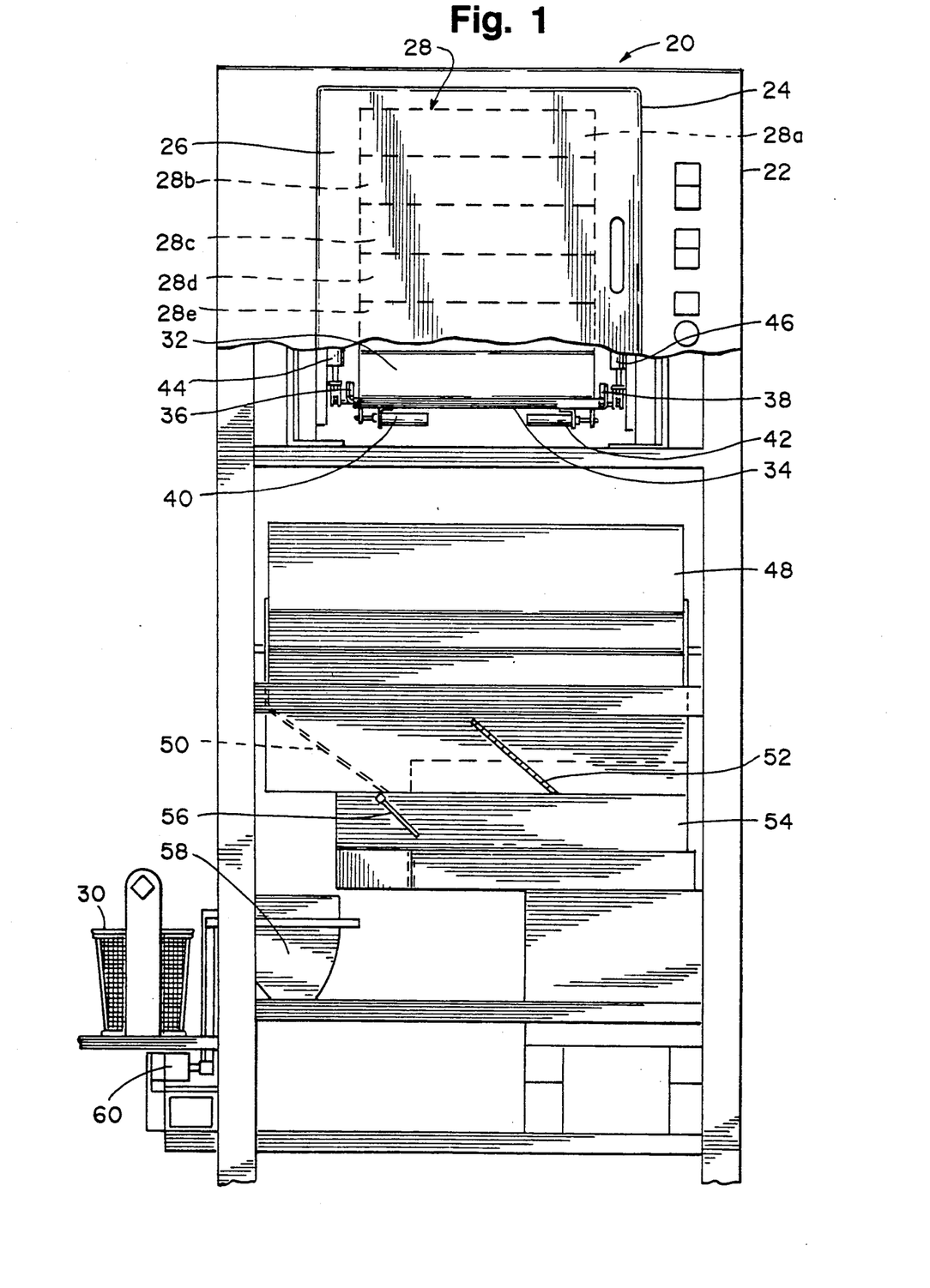
FIG. 1 is a partial front elevation view of one embodiment of the food dispenser with a portion of the dispenser cabinet omitted to show interior dispenser detail.

The general arrangement of dispenser components is best described in conjunction with FIG. 1. FIG. I is a front view of a portioning dispenser 20 for containerized bulk food items in accordance with the present invention. Dispenser 20 is especially useful in quick service restaurants or kitchens where containers of bulk food items must be opened and quickly and accurately portioned.

The components of dispenser 20 are generally contained within a cabinet 22 having a cabinet door 24 which provides access to a container hopper 26. Hopper 26 is designed to store a plurality of unopened french fry boxes 28a-e and 32 which will eventually be opened, emptied and discarded by dispenser 20. The french fries emptied from boxes 28a-e and 32 will eventually be portioned and dispensed into a fry basket 30. Boxes 28a-e and 32 are of a desired size and are constructed of paperboard. One convenient size box contains 6 pounds of frozen uncooked french fries.

Dispenser 20 generally requires limited operator attention beyond replenishing the supply of boxes 28 in hopper 26 and removing fry basket 30 from dispenser 20 after dispenser 20 has dispensed the desired portion of french fries into basket 30, which can be accomplished by an automated system as disclosed in U.S. patent application Ser. No. 07/519,387, filed concurrently herewith and entitled "Food Preparation System and Method." Dispenser 20 is especially useful in such a system. The multiple box capacity of hopper 26 allows dispenser 20 to consecutively empty several boxes without requiring an operator to add a new box each time a box is emptied.

French fries are emptied from boxes 28 by opening and tiling a lowermost box 32. As shown in FIG. 1, boxes 28a-e and 32 are stored in hopper 26 in a vertical stack 28. Lowermost box 32 sits on a pivotable platform 34 and can be held in place on platform 34 by box clamps 36 and 38. Clamps 36 and 38 prevent box 32 from falling from platform 34 when platform 34 is in a non-horizontal position. Clamps 36 and 38 are forced against opposing sides of box 32 to hold box 32 in place on platform 34 by activating a pair of box clamp cylinders 40 and 42, respectively. After box 32 has been clamped to platform 34 and opened, platform 34 can be pivoted to a non-horizontal position (about a 45° angle from horizontal) by actuating a pair of box dump cylinders 44 and 46, as will be discussed in detail in conjunction with FIGS. 2 and 4. As illustrated, cylinders 40, 42, 44 and 46 are two-position pneumatic cylinders, but could be any type of multiple position cylinders known in the art.

Figure 2:
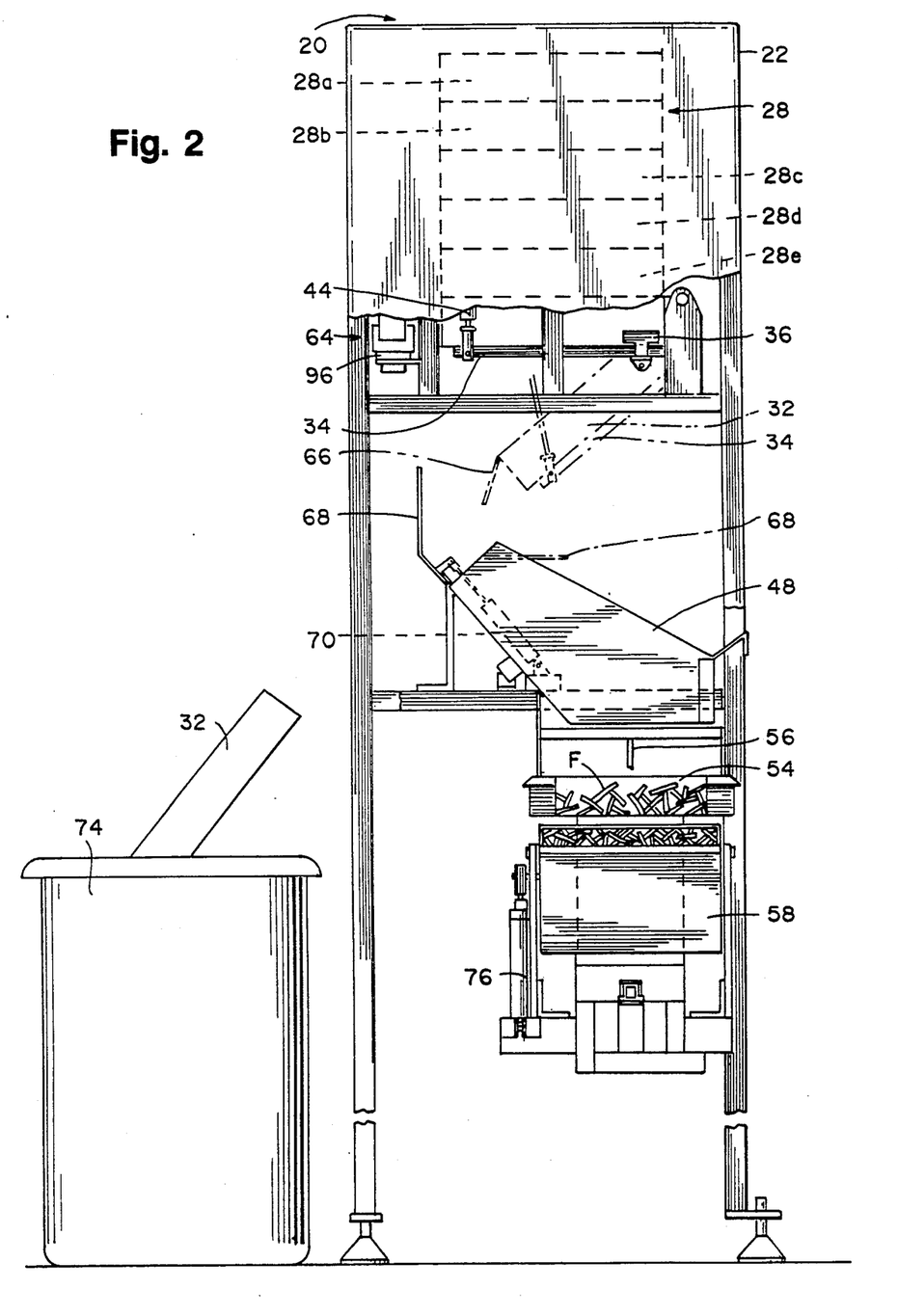
FIG. 2 is a side elevation view of the dispenser of FIG. 1 with a portion of the dispenser cabinet omitted to show interior dispenser detail.

Referring now to FIGS. 1 and 2, pivoting platform 34 allows french fries F to fall from box 32 onto a chute 48 which includes diverters 50 and 52 (visible only in FIG. 1) and finger 56, which help direct and evenly distribute french fries F into a vibratory feeder 54.

A counter (not shown) keeps track of the weight or the number of batches emptied from tray 58. After a predetermined amount of french fries have been dispensed from tray 58, dispenser 20 is signaled to open the next box 28e of french fries F in stack 28 and subsequent boxes as they are needed.

Figure 5:
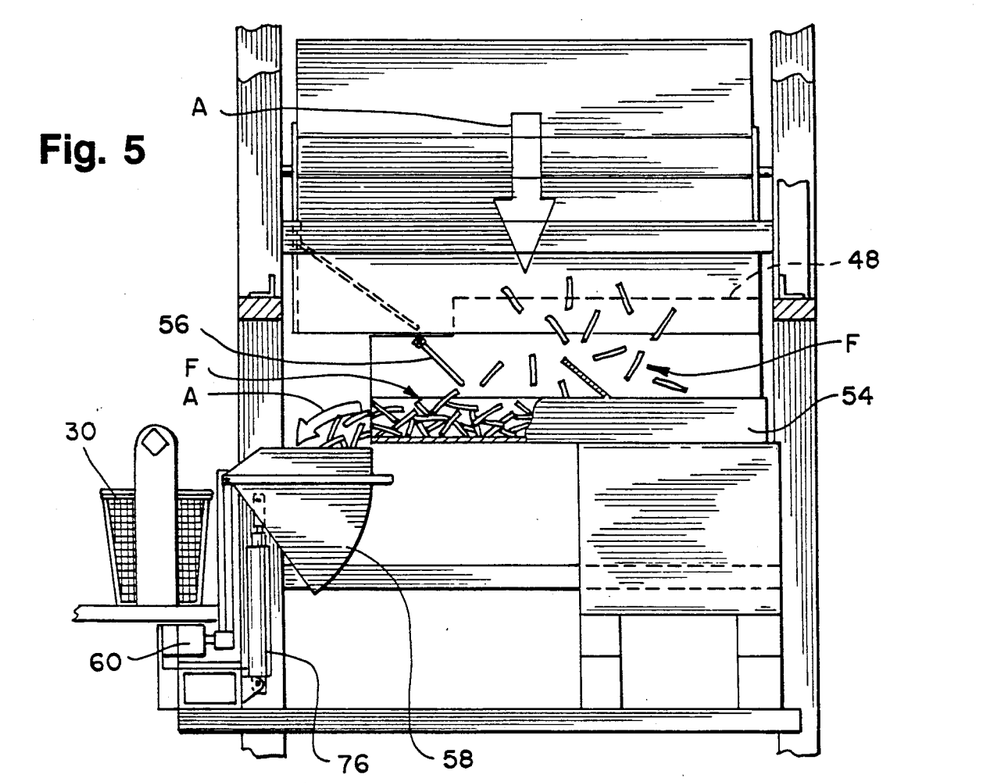
FIG. 5 is a fragmentary front elevation view of the bottom portion of the interior of the dispenser of FIG. 2 showing components involved in the vibratory portioning of food items.

The vibration of feeder 54 causes fries F to move horizontally in the direction of arrow A in FIG. 5 and then fall from feeder 54 into a pivotable transfer tray 58. The weight of items in tray 58 can be measured by a load cell 60 to determine when a desired portion of french fries has accumulated in tray 58. Tray 58 is then emptied into fry basket 30 for further processing. Such vibration feeders and load cells are well known in the art and a detailed description is therefore not provided here. A suitable vibration feeder is available from Eriez, Model No. 30A and a suitable load cell is available from Interlaken Technology Corp., Model No. FS500-C10.

Additional details of dispenser 20 are further illustrated in the side elevation view of FIG. 2. FIG. 2 illustrates how platform 34 is pivoted when platform 34 is moved by actuating dump cylinders 44 and 46 (more completely illustrated in FIG. 4). At the beginning of a box emptying cycle, platform 34 is in a horizontal position. While platform 34 is in this horizontal position, a box slitter 64 can traverse the lower rear panel 66 of box 32. This allows rear panel 66 to swing away from the rest of box 32 when platform 34 is tilted from its initial horizontal position. The french fries in box 32 can then fall onto chute 48 as previously described in conjunction with FIG. 1. In the preferred embodiment, dump cylinders 44 and 46 may be actuated several times to ensure that the french fries are dislodged from box 32.

Once box 32 has been emptied, it can be disposed of. To dispose of box 32, a chute dump door 68 is first lowered by actuating a pair of dump door cylinders 70, one located on each side of door 68 (shown in phantom in FIG. 2). Next, box clamps 36 and 38 are retracted from box 32 by actuating a pair of box clamp cylinders 40 and 42 (see FIG. 1). This allows box 32 to slide from platform 34 and over the top of lowered dump door 68. Dump door 68 then directs box 32 through an opening in the rear of cabinet 22 and into a waste container 74.

FIG. 2 also illustrates the structure for discharging the measured french fry portions from dispenser 20. Once load cell 60 (see FIG. 1) indicates that a desired quantity of french fries has accumulated in transfer tray 58, transfer tray dump cylinder 76 can be actuated. This causes transfer tray 58 to pivot approximately 90 degrees, thereby dumping the contents of tray 58 into fry basket 30, as will be discussed in detail in conjunction with FIG. 6.

Dispenser 20 operation is controlled by a controller (not shown) which can be any type of automated controller well known in the art. The controller sequentially initiates the actions which will now be discussed in conjunction with FIGS. 3-10. While the following automated sequence of operation is representative of the illustrated embodiment, other sequences of operation are possible.

Figure 3:
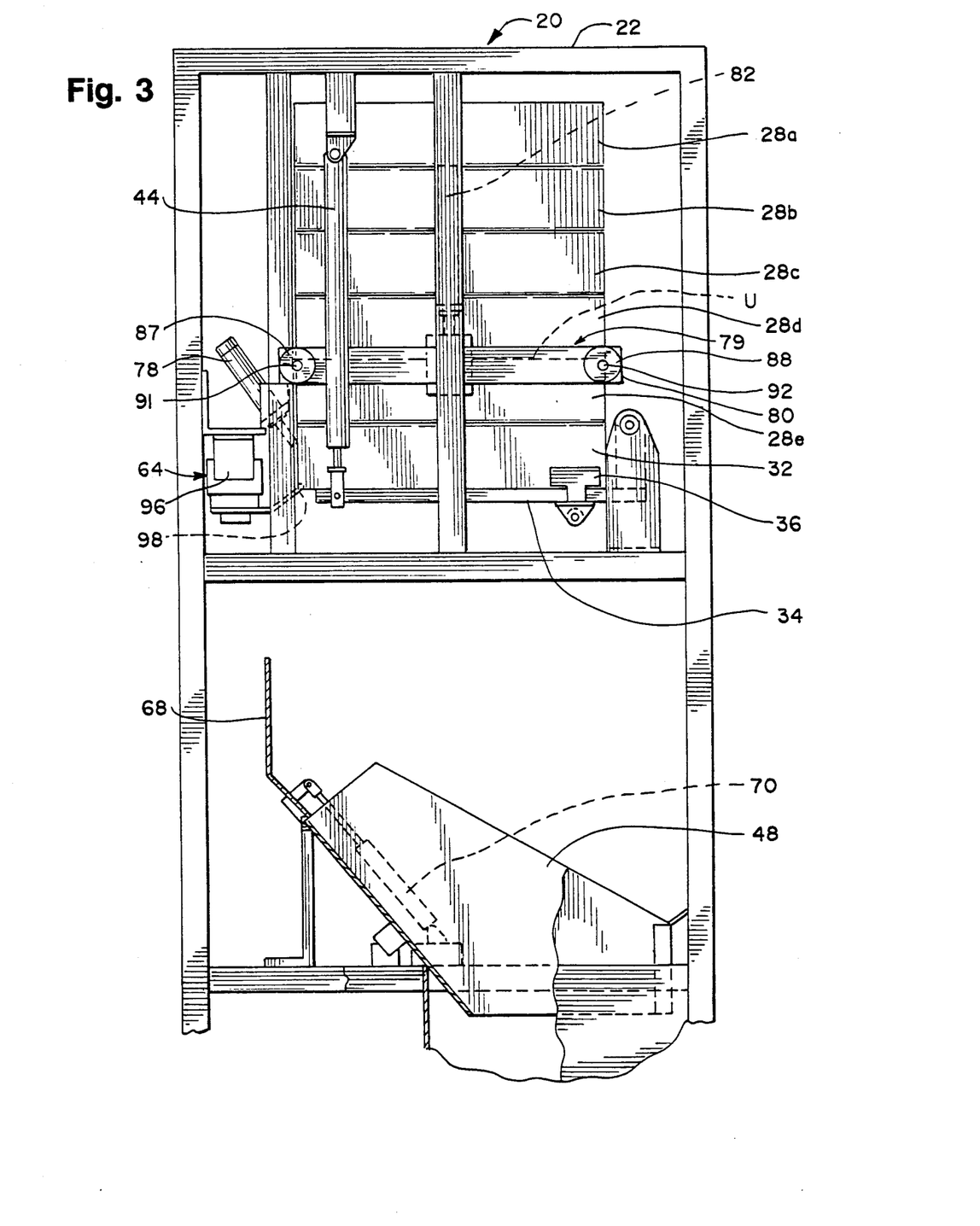
FIG. 3 is an enlarged fragmentary side elevation view of the upper half of the dispenser of FIG. 2.
Figure 4:
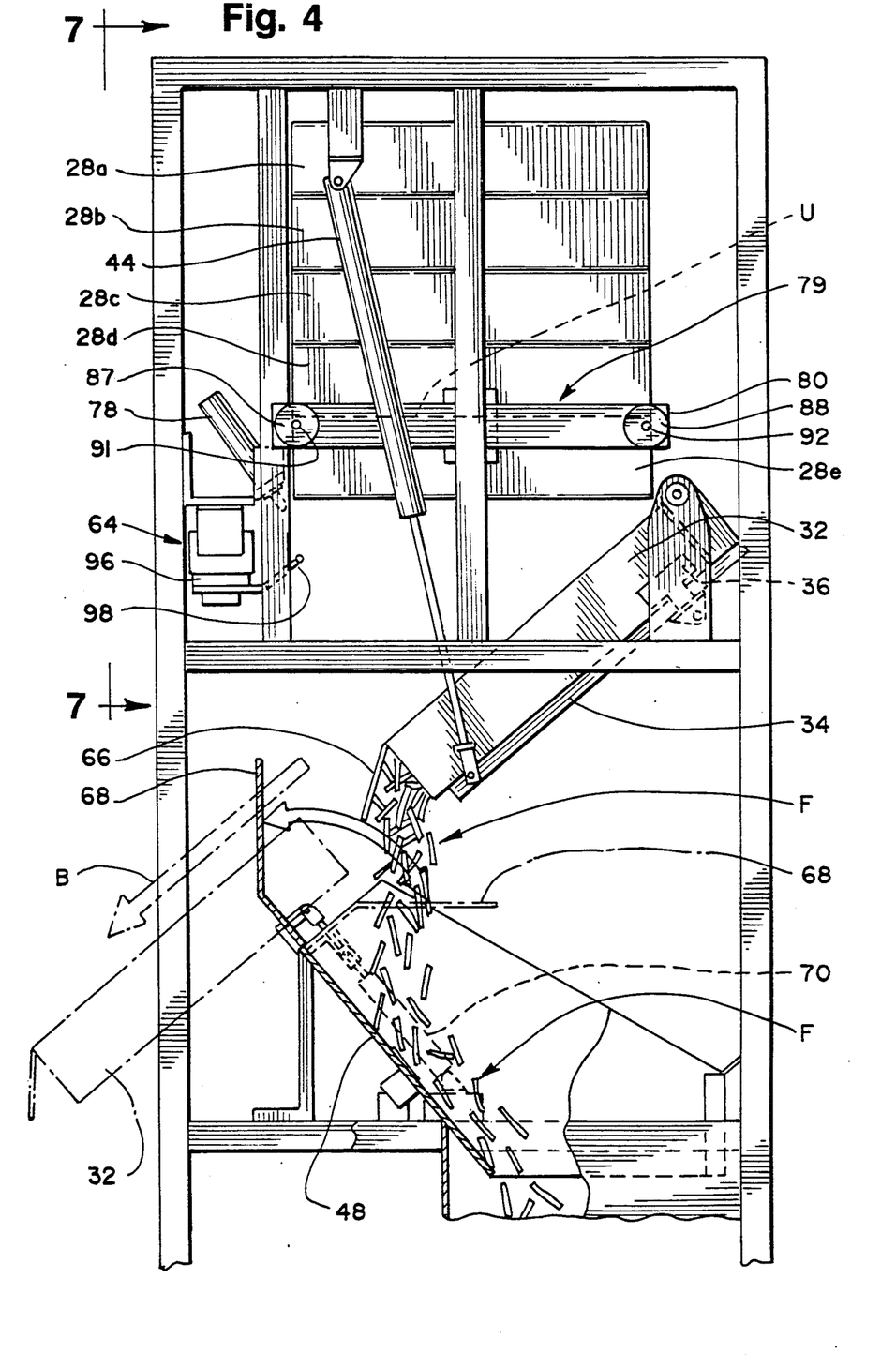
FIG. 4 is an enlarged fragmentary side elevation view of the dispenser of FIG. 2 illustrating the operation of some of the dispenser components.

The automatic operation of dispenser 20 begins with automatic box opening and emptying as best discussed in conjunction with FIGS. 3 and 4. At the beginning of the box opening and emptying cycle, lowermost box 32 is aligned on platform 34 by a push-down cylinder 78. Cylinder 78 applies a downward and inward force to rear panel 66 of box 32 at a point 104 illustrated in FIG. 10 where slitter 64 first enters box 32, which forces box 32 downward and inward. In the preferred embodiment, cylinder 78 is cycled three times to push against rear panel 66, thereby ensuring that box 32 is properly oriented for the subsequent opening and emptying operations.

Once box 32 has been properly positioned, a box stack frame 79 is used to support and fix the position of all boxes (boxes 28a-e) stacked above box 32. Stack frame 79 includes a pair of stack frame members 80 and 81 (see FIG. 7). Members 80 and 81 are vertically moveable by actuating a pair of stack frame cylinders 82 (shown in phantom in FIG. 3) and 83 (not visible in FIG. 3). Cylinders 82 and 83 move stack frame 79 between an upper box position U (shown in FIGS. 3 and 4) and a lower box position L (shown in FIG. 7). Positions U and L are sensed by a pair of position sensors 84 and 85 (illustrated in FIG. 7). Preferably, sensors 84 and 85 are Hall effect sensors which have no moving parts which can wear out. Such sensors are commercially available from the Bimba Manufacturing Company of Monee, Ill.

Figure 7:
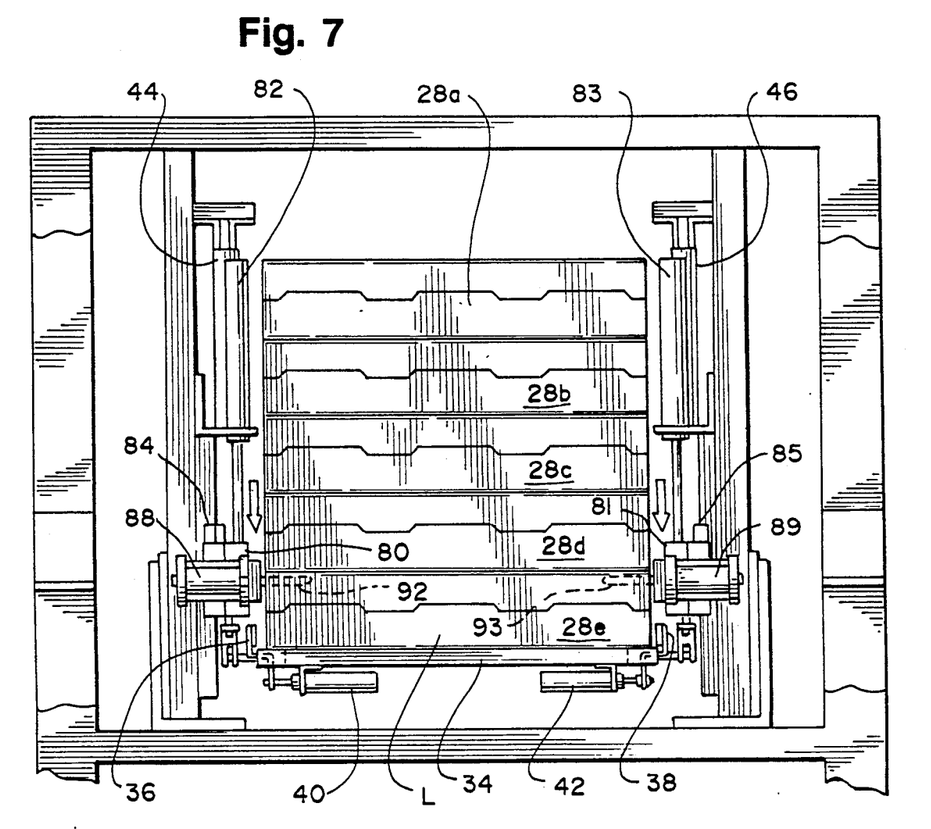
FIG. 7 is an enlarged fragmentary front elevation view of the dispenser of FIG. 4 taken along line 7—7 of FIG. 4 which illustrates the storage and movement of bulk food containers in the dispenser.

Stack frame 79 also includes four box support cylinders 87, 88, 89 and 90 which can be actuated to cause four box support pins 91, 92, 93 and 94 to pierce a second lowermost box 28e near its four upper corners. Box support pins 91, 92, 93 and 94 then support second lowermost box 28e and the remaining plurality of boxes 28 to prevent their movement during the opening and emptying operations on lowermost box 32.

Once stack frame 79 has fixed the position of box stack 28, box 32 is secured to platform 34 by actuating box clamp cylinders 40 and 42 as was previously described in conjunction with FIG. 1. Dump door cylinders 70 are next actuated to lower dump door 68 in preparation for the box opening process.

Figures 9, 10:
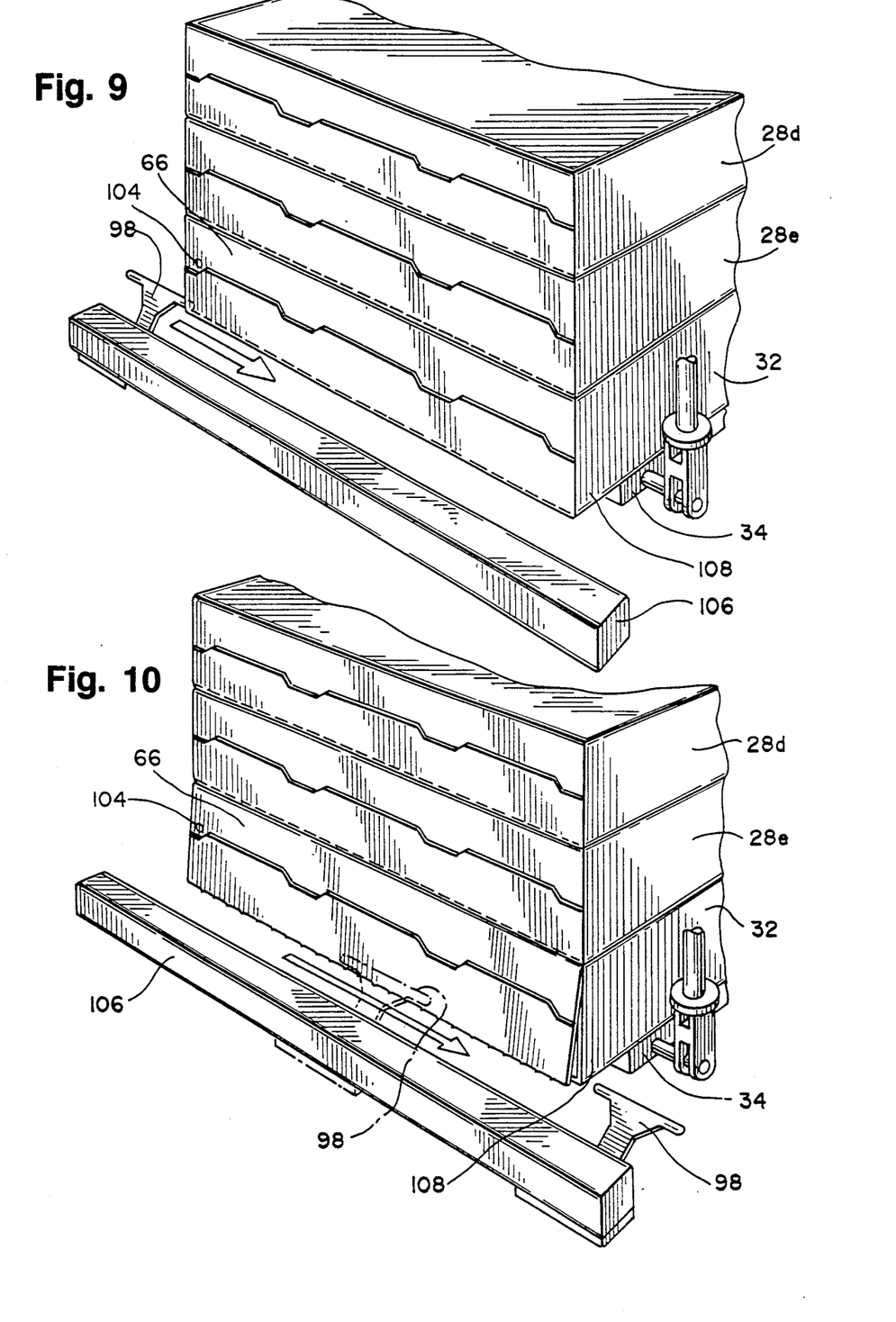
FIG. 9 is a perspective view of a stack of boxes prior to the slitting open of the lowermost box by the dispenser box slitter.
FIG. 10 is a perspective view of a stack of boxes after the lowermost box has been slit open by the box slitter.

After dispenser 20 is made ready for opening box 32, box 32 is cut open along rear panel 66 by box slitter 64. As shown, box slitter 64 includes a box slitter cylinder 96 and a knife 98. When slitter cylinder 96 is actuated, knife 98 extends through the bottom of rear panel 66 of box 32. Slitter 64 is then moved along the length of rear panel 66 to slit box 32 along its entire length as best seen in FIGS. 9 and 10. Any waste materials generated in the cutting process will be prevented from reaching feeder 54 because dump door 68 is in the lowered position shown in phantom in FIG. 4. This causes any paper cuttings generated by box slitter 64 to be deflected into waste container 74 as shown in FIG. 2. Once cutting operations are completed, box slitter 64 is returned to its original position.

After the box opening process has been completed, the box emptying cycle begins. Referring now to FIG. 4, dump door cylinders 70 are actuated to raise dump door 68 to the raised position. This makes chute 48 ready for receiving french fries F from box 32. The emptying of box 32 begins when box dump cylinders 44 and 46 (shown in FIG. 7) are actuated, causing platform 34 to pivot to an inclined position with the open end of box 32 pointing towards raised dump door 68. This causes french fries F to fall from inclined box 32 onto chute 48 which in turn directs french fries F toward vibratory feeder 54 for dispensing as will be discussed in detail in conjunction with FIGS. 5 and 6. In the preferred embodiment, cylinders 44 and 46 may be actuated repetitively to shake box 32 several times to help ensure that all fries have been discharged from box 32.

Figure 6:
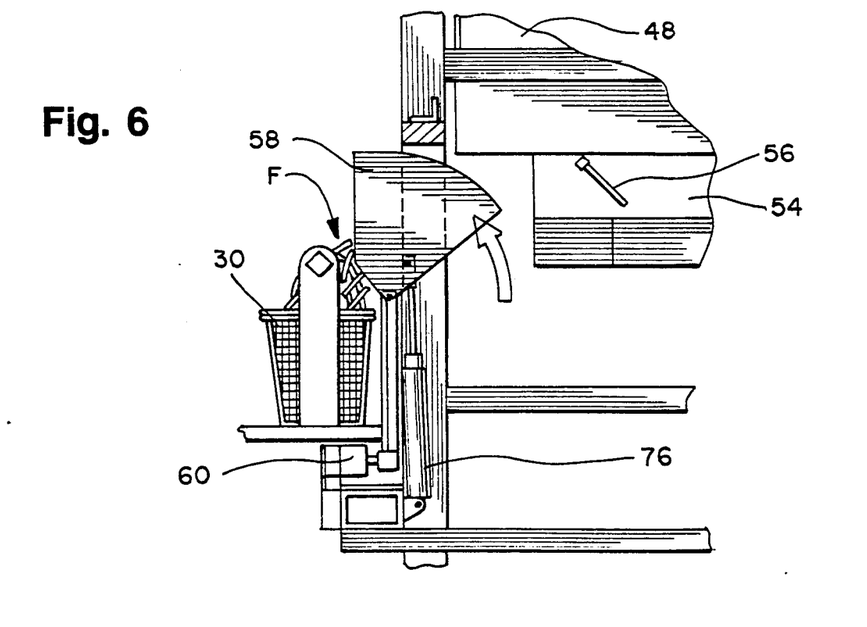
FIG. 6 is an enlarged fragmentary front elevation view of the dispenser invention illustrating the operation of the dispenser transfer tray.

The portioning of french fries F emptied from box 32 is best described in conjunction with FIGS. 5 and 6. Referring first to FIG. 5, chute 48 directs french fries F into vibratory feeder 54. Feeder 54 then vibrates, causing fries F to fall into transfer tray 58 until a predetermined weight of fries is accumulated as determined by load cell 60. Cell 60 provides a signal to stop vibratory feeder motion when the desired amount, in this case approximately one and one-half pounds of fries F has been supplied into tray 58 by feeder 54.

The accumulated portion of fries F in tray 58 is dispensed into fry basket 30 by pivoting tray 58 towards basket 30. This is accomplished by actuating transfer tray dump cylinder 76 as illustrated in FIG. 6. This causes the measured portion of french fries F to fall into basket 30, which is then removed for frying. The portioning process just described is repeated until the level of fries F in vibratory feeder 54 is sufficiently low to require the emptying of the next french fry box.

Referring again to FIG. 4, the replenishment of feeder 54 begins by disposal of empty box 32. First, dump door cylinders 70 are actuated to lower dump door 68 to the lowered position shown in phantom in FIG. 4. Next, box clamp cylinders 40 and 42 are actuated to withdraw box clamps 36 and 38 from empty box 32. Withdrawing clamps 36 and 38 allows box 32 to slide from platform 34 in the direction of arrow B, past lowered dump door 68 and into waste container 74 as shown in FIG. 2. After box 32 has been discarded, box dump cylinders 44 and 46 are actuated to raise empty platform 34 to its initial horizontal position.

Turning now to FIG. 7, feeder replenishment continues by placing box 28e onto platform 34. To accomplish this, stack frame 79 is lowered by actuating stack frame cylinders 82 and 83 to allow box 28e to rest on platform 34 in the position originally occupied by box 32 as shown in FIG. 2. Box support cylinders 87, 88, 89 and 90 are then actuated to retract box support pins 91, 92, 93 and 94. Next, stack frame 79 is raised to the level of new second lowermost box 28d and cylinders 87, 88, 89 and 90 are actuated to drive pins 91, 92, 93 and 94 into box 28d, thereby retaining box 28d and any boxes stacked above it.

Figure 8:
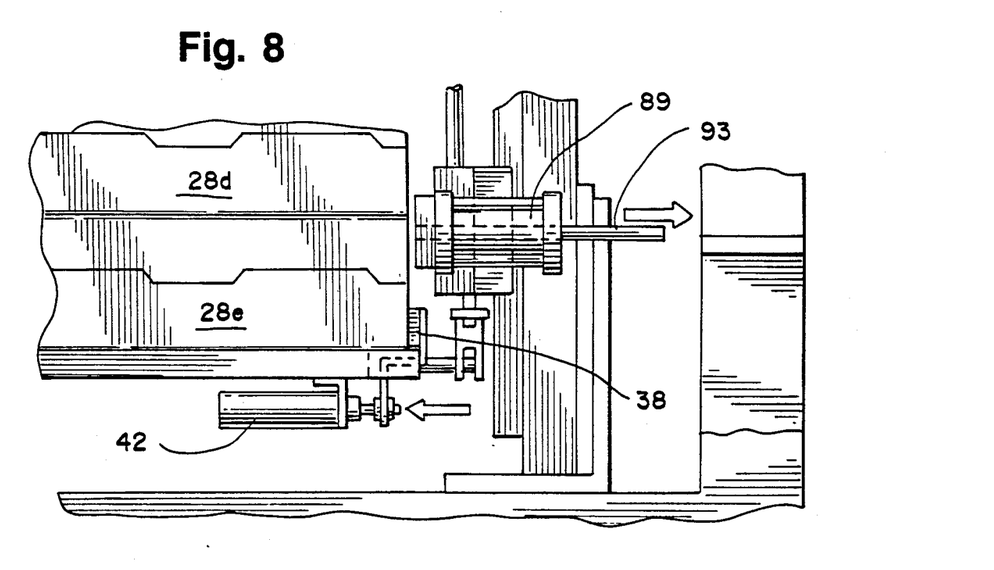
FIG. 8 is an enlarged fragmentary front view showing the operation of a box support cylinder and a box support pin.

FIG. 8 illustrates the operation of box support cylinder 89 and its cooperative box support pin 93 in greater detail. As illustrated, pin 93 extends coaxially through cylinder 89 and has been retracted just prior to the raising of stack frame 79 for engaging box 28d.

FIGS. 9 and 10 illustrate the box slitting process in greater detail. As discussed in conjunction with FIG. 3, push down cylinder 78 (not shown) impacts on lowermost box 32 at a push down cylinder impact point 104 located near an outer edge of rear panel 66. Preferably, rear panel 66 is impacted at point 104 three times prior to the cutting operation to ensure that knife 98 will slit rear panel 66 along the proper track. Slitter cylinder 96 is next actuated, causing knife 98 to cut panel 66. Knife 98 is next transversed across a slitter track 106. This slits the entire lower rear length of box 32 and allows fries to be dumped from box 32 as described in conjunction with the previous figures It should be noted that rear flap 66 is not physically connected to box side panels 108. This allows panel 66 to move freely after being slit only across its bottom edge as shown in FIG. 10.

While the invention has been described with respect to certain preferred embodiments, it is to be understood that the invention is capable of numerous changes, modifications and rearrangements without departing from the invention as defined in the claims.

What is claimed is:

1. A dispenser for dispensing food items from a bulk item container comprising:
    container receiving means for receiving and retaining a stack of one or more unopened containers;
    container opening means for opening one end of a stored container retained by said receiving means;
    container dumping means including a pivotable platform for dumping at least a portion of the items from the opened container by tilting downwardly the open end of the container while retaining the container on said container receiving means;
    item receiving means located generally below said dumping means for receiving the items dumped from the opened container; and
    received item discharge means for discharging a preselected amount of the received items from the receiving means to a location adjacent the dispenser.

2. The dispenser of claim 1 which further comprises a container discharging means for disposing of the bulk item container after dumping items contained therein.

3. The dispenser of claim 2 which further comprises a container replacing means for replacing on said pivotable platform the disposed of container with an unopened container from said stack.

4. The dispenser of claim 3 which further comprises unopened container retaining means for preventing movement of any unopened containers in said stack while items are removed from the opened container.

5. The dispenser of claim 1 wherein said dumping means includes an opened container securing means for securing the oriented container to said dumping means.

6. The dispenser of claim 2 which further comprises a chute means for directing emptied items to said receiving means.

7. The dispenser of claim 1 wherein said chute means further includes a moveable upper chute means for allowing an emptied container to pass by said chute means during container disposal.

8. The dispenser of claim 1 wherein said receiving means includes a vibratory means for vibrating items out of said receiving means and into said discharge means.

9. The dispenser of claim 8 wherein said receiving means includes a receiving means contents indicating means for initiating the emptying of a container when the amount of items present in said receiving means falls below a preset amount.

10. The dispenser of claim 1 which further comprises item portioning means for accumulating a predetermined amount of items received from said item receiving means and for releasing the received items to said received item discharge means when the desired amount of items has been accumulated in said portioning means.

11. The dispenser of claim 10 wherein said portioning means includes a scale means for determining the weight of the received items present in said portioning means.

12. The dispenser of claim 4 wherein said container receiving means includes vertical hopper means for storing a plurality of vertically stacked bulk item containers.

13. The dispenser of claim 12 wherein said container retaining means includes a stack retaining means for preventing vertical movement of the unopened containers during dispensing of items from a lowermost container by retaining the second lowermost container in the vertical stack.

14. The dispenser of claim 13 wherein said stack retaining means includes a container penetrating means for penetrating at least one non-horizontal surface of the second lowermost container, thereby preventing the vertical movement of the second lowermost container.

15. The dispenser of claim 14 wherein said container replacing means includes vertical movement means for lowering said container retaining means, thereby replacing a disposed of container with a next lowermost container in the container stack.

16. The dispenser of claim 4 wherein said container opening means includes container puncturing means for opening the container.

17. The dispenser of claim 16 wherein said puncturing means includes moveable slitting means for slitting open the container.

18. The dispenser of claim 17 wherein said opening means further comprises a moveable finger for applying a downward force to the container while on said platform to insure proper orientation before opening.

19. A portioning dispenser for containerized bulk items comprising:
- a container hopper for storing a stack of one or more containers of bulk items;
- a container platform located generally below said stack for supporting and retaining a container to be opened;
- a container opening device for opening a side of a container retained on said platform; and
- a dumping device for emptying the bulk items from the opened container by tilting said open box side downwardly.

20. The dispenser of claim 19 further comprising a feeder for receiving and selectively discharging the bulk items dumped from at least one container.

21. The dispenser of claim 20 wherein said feeder vibrates for selectively discharging the bulk items.

22. The dispenser of claim 20 further comprising a portioning device for receiving and measuring the quantity of items dispensed from, said feeder.

23. The dispenser of claim 22 further comprising a portion transferring device responsive to said portioning device for transferring a measured portion of items from the dispenser when a predetermined amount of items has accumulated in said portioning device.

24. The dispenser of claim 19 wherein said hopper is a vertical hopper for containing a plurality of vertically stacked containers.

25. The dispenser of claim 24 wherein said hopper includes a stacked container retention device for supporting at least one of a plurality of stacked containers.

26. The dispenser of claim 25 wherein said retention device immobilizes a second lowermost stacked container, thereby preventing the second lowermost container and any containers stacked above the second lowermost container.

27. The dispenser of claim 26 wherein said retention device comprises at least one container penetrating member for penetrating movement of the second lowermost container, thereby preventing vertical movement of the second lowermost container and any containers stacked above it.

28. The dispenser of claim 27 wherein said retention device includes at least a pair of container penetrating members for penetrating opposing sides of the second lowermost container.

29. The dispenser of claim 19 wherein said container platform includes at least one container clamp for retaining the container on the platform.

30. The dispenser of claim 29 wherein said platform includes a pair of inwardly moveable clamps located on opposite sides of and at the periphery of said platform for retaining the container between said clamps.

31. The dispenser of claim 19 wherein said container opening device includes a container puncturing member capable of movement along at least a portion of a container surface for penetrating and tearing open the container 32. The dispenser of claim 31 wherein said opening device further includes a push-down device for ensuring that the container to be opened is properly positioned on said platform prior to its being engaged by said container puncturing member.

33. The dispenser of claim 29 wherein said dumping device comprises a pivotable platform.

34. The dispenser of claim 33 wherein said dumping device further includes a dump cylinder for lowering a side of said pivotable platform, thereby emptying at least some of the bulk items from an opened container clamped to said platform.

35. The dispenser of claim 33 which further includes a chute having a moveable dump door, said dump door moveable between a first position for directing dumped items into said chute and a second position for deflecting waste items away from said chute.

36. A portioning dispenser for boxed bulk food items comprising:
- a container hopper for storing at least one bulk food item box;
- a pivotable platform located generally beneath said box for receiving and supporting a bulk food item box to be opened and emptied and for dumping items from the opened box when said platform is moved to an inclined position;
- a box slitter located generally adjacent said platform for tearing open at least a side of the box to be opened;
- at least one box clamp for retaining the box to be opened on said platform;
- a platform dump mechanism for tilting said platform downward toward the slit open box end, thereby enabling food items to fall from said slip open box;
- a chute located generally below said dump mechanism for directing food items dumped from the emptied box;
- a feeder for receiving the food items directed by said chute and for selectively discharging items accumulated in said feeder;
- a transfer tray located generally below said feeder for receiving items discharged from said feeder;
- a scale operatively connected to said transfer tray for measuring the quantity of food items present in said transfer tray; and
- a transfer tray dump device for dispensing the food items from said transfer tray when said measuring device indicates that said tray contains a predetermined portion of food items.

37. The dispenser of claim 36 wherein said container hopper is a vertical hopper for storing a plurality of vertically stacked boxes.

38. The dispenser of claim 37 wherein said hopper includes a stack frame for retaining all but a lowermost stacked box.

39. The dispenser of claim 37 wherein said stack frame includes at least a pair of moveable box support pins for penetrating opposite sides of a second lowermost box, thereby preventing movement of the second lowermost box and any boxes stacked above the second lowermost box.

40. The dispenser of claim 39 wherein said stack frame includes at least one stack frame cylinder attached to said stack frame for moving the stack frame between a second lowermost box position and a lowermost box position, thereby permitting the second lowermost box to be lowered to said platform after the lowermost box has been emptied and removed from said platform.

41. The dispenser of claim 36 wherein said pivotable platform includes at least one dump cylinder for pivoting said platform between a first horizontal position and a second inclined position, thereby allowing food items to fall from a torn open box when said platform is in said second inclined position.

42. The dispenser of claim 41 wherein said chute includes a moveable dump door, said door moveable between a first position for directing food items into said chute and a second position for directing emptied boxes from said chute.

43. The dispenser of claim 42 wherein said dump door includes at least one dump door cylinder for moving said door between said first and second positions.

44. The dispenser of claim 36 wherein said feeder is a vibratory feeder for vibrating the received food items into said transfer tray.

45. The dispenser of claim 36 wherein said feeder includes a top off finger for measuring the level of food items in said feeder and initiating the emptying of a full box when the feeder level falls below a predetermined level.

46. The dispenser of claim 36 wherein said scale is a load cell for weighing the contents of said transfer tray.

47. The dispenser of claim 36 wherein said platform includes a pair of inwardly moveable box clamps located on opposite sides of said platform for clamping to said platform.

48. The dispenser of claim 47 wherein each said clamp includes a box clamp cylinder for moving each said clamp between an inward box clamping position and an outbound non-clamping position.

49. The dispenser of claim 36 wherein said transfer tray is pivotably mounted to said dispenser for allowing said transfer tray contents to be dumped from the dispenser.

50. The dispenser of claim 49 wherein said transfer tray includes at least one transfer tray dump cylinder for pivoting said transfer tray, to allow the items in said transfer tray to be dumped from the dispenser.

51. The dispenser of claim 36 wherein said dispenser further comprises a push-down cylinder for properly positioning the box to be opened prior to the slitting of said box by said box slitter.

52. The dispenser of claim 51 wherein said box slitter comprises a tear finger for penetrating and tearing the box and a tear cylinder for horizontally moving said tear finger along at least a portion of a rear panel of said box.

53. A method for dispensing bulk food items from at least one bulk item container comprising the steps of:
retaining one or more bulk containers in a hopper;
automatically opening a side of a bulk item container stored in the hopper;
tipping the container to spill its contents into a feeder located generally below said container;
discharging items from the feeder;
accumulating and measuring a quantity of items discharged from the feeder into a transfer tray located generally below said feeder; and
dispensing the accumulated items from the transfer tray when a desired portion of items has accumulated in the transfer tray.

54. The method of claim 53 wherein said feeder discharging step includes vibrating the feeder to transport items from it to the transfer tray.

55. The method of claim 54 wherein said measuring step includes weighing the items in the transfer tray.

56. The method of claim 54 wherein said opening step includes slitting open a box by slitting a rear box panel along its length.

57. The method of claim 54 wherein said tipping step includes clamping a box to a pivotable platform and tipping the platform to spill the box contents.

58. The method of claim 54 which further comprises discarding the emptied container and replacing it with another container stored in the dispenser.

59. The method of claim 38 which further comprises retaining at least one unopened container in a vertical hopper above the opened box by inserting a plurality of pins into the container to prevent it from moving.

60. The method of claim 59 which further comprises lowering the retained box to the platform after an empty box has been discarded.

61. A portioning dispenser for containerized bulk food items comprising:
a vertical hopper for storing a plurality of stacked containers of bulk food items;
a stacked container retention device for retaining at least one of the stacked containers;
a container platform located generally below said stack for supporting and retaining a container to be opened;
a container opening device for opening a container retained on said platform; and
a dumping device for emptying the bulk food items from the opened container.

62. The dispenser of claim 61 wherein said retention device immobilizes a second lowermost stacked container, thereby preventing movement of the second lowermost container and any containers stacked above the second lowermost container.

63. The dispenser of claim 62 wherein said retention device comprises at least one container penetrating member for penetrating the second lowermost container, thereby preventing vertical movement of the second lowermost container and any containers stacked above it.

64. The dispenser of claim 63 wherein said retention device includes at least a pair of container penetrating members for penetrating opposing sides of the second lowermost container.

65. A portioning dispenser for containerized bulk items comprising:
a container hopper for storing a stack of one or more containers of bulk items;
a container platform located generally below said stack for supporting and retaining a container to be opened, said platform including at least one container clamp for retaining the container on the platform;
a container opening device for opening a container retained on said platform; and
a dumping device for emptying the bulk items from the opened container.

66. The dispenser of claim 65 wherein said platform includes a pair of inwardly moveable clamps located on opposite sides of and at the periphery of said platform for retaining the container between said clamps.

67. A portioning dispenser for containerized bulk items comprising:
a container hopper for storing a stack of one or more containers of bulk items;

a container platform located generally below said stack for supporting and retaining a container to be opened;

a container opening device for opening a container retained on said platform, said opening device including a container puncturing member capable of movement along at least a portion of a container surface for penetrating and tearing open the container and further including a push down device for insuring that the container to be opened is properly positioned on said platform prior to its being engaged by said container puncturing member; and a dumping device for emptying the bulk items from the opened container.

68. The dispenser of claim 65 wherein said dumping device comprises a pivotable platform.

69. The dispenser of claim 68 wherein said dumping device further includes a dump cylinder for lowering a side of said pivotable platform, thereby emptying at least some of the bulk items from an opened container clamped to said platform.

70. The dispenser of claim 65 which further includes a chute having a moveable dump door, said dump door moveable between a first position for directing dumped items into said chute and a second position for deflecting waste items away from said chute.

71. A method for dispensing bulk food items from at least one bulk item container comprising the steps of:
retaining one or more bulk containers in a hopper;
opening a bulk item container stored in the hopper;
clamping the open box to a pivotable platform;
tipping the container to spill its contents into a feeder located generally below said container;
discharging items from the feeder by vibratory movement of the feeder;
accumulating and measuring a quantity of items discharged from the feeder into a transfer tray located generally below said feeder; and
dispensing the accumulated items when a desired portion of items is accumulated in the transfer tray.

72. A method for dispensing bulk food items from at least one bulk item container comprising the steps of:
retaining one or more bulk containers in a hopper;
opening a bulk item container stored in the hopper;
retaining at least one unopened container in a vertical hopper above the open box by inserting a plurality of pins into the container to prevent it from moving;
tipping the container to spill its contents into a feeder located generally below said container;
discarding the empty container and replacing it with another container stored in the dispenser;
discharging items from the feeder by vibratory movement of the feeder;
accumulating and measuring a quantity of items discharged from the feeder into a feeder transfer tray located generally below said feeder; and
dispensing the accumulated items from the transfer tray when a desired portion of items has accumulated in the transfer tray.

73. The method of claim 72 which further comprises lowering the retained box to the platform after an empty box has been discarded.

* * * * *

UNITED STATES PATENT AND TRADEMARK OFFICE
CERTIFICATE OF CORRECTION

PATENT NO. : 5,104,002
DATED : April 14, 1992
INVENTOR(S) : Robert L. Cahlander et al.

It is certified that error appears in the above-indentified patent and that said Letters Patent is hereby corrected as shown below:

TITLE PAGE:
Under "References Cited" delete "3,279,653" and insert therefor --3,279,635--.

Column 3, line 58, delete "vibrator-y" and insert therefor --vibratory--.

Column 4, line 2, after "FIG." (second occurrence), delete "I" and insert therefor --1--.

Column 7, line 48, after "figures" insert a period --.--.

Column 9, line 30, after "from" delete the comma ",";

line 44, after "preventing" insert --movement of--;

line 49, delete "movement of"; and lines 67-68, after "container" insert a period --.--.

Column 12, line 12, delete "38" and insert therefor --58--.

Signed and Sealed this

Fourteenth Day of December, 1993

Attest:

BRUCE LEHMAN

*Attesting Officer*      *Commissioner of Patents and Trademarks*